(12) United States Patent
Mather et al.

(10) Patent No.: US 9,533,469 B2
(45) Date of Patent: Jan. 3, 2017

(54) SELF-HEALING PRODUCT

(75) Inventors: Patrick Mather, Manlius, NY (US); Xiaofan Luo, Syracuse, NY (US)

(73) Assignee: Syracuse University, Syracuse, NY (US)

(*) Notice: Subject to any disclaimer, the term of this patent is extended or adjusted under 35 U.S.C. 154(b) by 550 days.

(21) Appl. No.: 12/644,766

(22) Filed: Dec. 22, 2009

(65) Prior Publication Data

US 2011/0003159 A1    Jan. 6, 2011

Related U.S. Application Data

(60) Provisional application No. 61/140,402, filed on Dec. 23, 2008.

(51) Int. Cl.
*B32B 9/04*    (2006.01)
*B32B 17/10*   (2006.01)
(Continued)

(52) U.S. Cl.
CPC .............. *B32B 7/02* (2013.01); *B32B 27/08* (2013.01); *B32B 27/12* (2013.01); *B32B 27/20* (2013.01); *B32B 27/30* (2013.01); *B32B 27/36* (2013.01); *B32B 27/40* (2013.01); *B32B 2262/02* (2013.01); *B32B 2262/0269* (2013.01); *B32B 2262/101* (2013.01); *B32B 2262/106* (2013.01); *B32B 2264/10* (2013.01); *B32B 2307/302* (2013.01); *B32B 2307/702* (2013.01); *B32B 2307/704* (2013.01); *B32B 2307/7163* (2013.01); *Y10T 428/31601* (2015.04)

(58) Field of Classification Search
None
See application file for complete search history.

(56) References Cited

U.S. PATENT DOCUMENTS 692,631 A    2/1902  Cooley
705,691 A    7/1902  Morton
(Continued)

FOREIGN PATENT DOCUMENTS

EP    1801140    *  6/2007

OTHER PUBLICATIONS

Chempolymerporject, Nathan Yip & David Wieand—Kevlar-E-nydw, Retreived on Aug. 11, 2012. http://chempolymerproject.wikispaces.com/Kevlar-E-nydw.*
(Continued)

*Primary Examiner* — Coris Fung
(74) *Attorney, Agent, or Firm* — Bond Schoeneck & King, PLLC; George McGuire; David Nocilly

(57) ABSTRACT

A self-healing product having a shape memory component and a healing component interpenetrating the shape memory component to form a fibrous microstructure. The healing component is selected so as to diffuse into a defect when the area of the product with the defect is subject to a treatment. The components may be selected so that applying heat at a temperature at or above a melting temperature (Tm) and/or a glass transition temperature (Tg) for one or both of the shape memory component and the healing component causes shape memory transition and diffusion by the healing component. The self-healing product can form a coating or material layer to protect a substrate while also providing the healing properties responsive to the treatment.

9 Claims, 8 Drawing Sheets

(51) Int. Cl.
*C08L 75/04* (2006.01)
*B32B 7/02* (2006.01)
*B32B 27/08* (2006.01)
*B32B 27/12* (2006.01)
*B32B 27/20* (2006.01)
*B32B 27/30* (2006.01)
*B32B 27/36* (2006.01)
*B32B 27/40* (2006.01)

(56) References Cited

U.S. PATENT DOCUMENTS

| | | |
|---|---|---|
| 1,975,504 A | 10/1934 | Formhals |
| 2,048,651 A | 7/1936 | Norton |
| 2,349,950 A | 5/1944 | Formhals |
| 4,472,228 A | 9/1984 | Yoshimura et al. |
| 5,470,893 A | 11/1995 | Sinclair-Day et al. |
| 5,561,173 A | 10/1996 | Dry |
| 5,660,624 A | 8/1997 | Dry |
| 5,803,963 A | 9/1998 | Dry |
| 5,989,334 A | 11/1999 | Dry |
| 6,075,072 A | 6/2000 | Guilbert et al. |
| 6,261,360 B1 | 7/2001 | Dry |
| 6,326,432 B1 | 12/2001 | Fujita et al. |
| 6,518,330 B2 | 2/2003 | White et al. |
| 6,527,849 B2 | 3/2003 | Dry |
| 6,713,011 B2 | 3/2004 | Chu et al. |
| 6,759,117 B2 | 7/2004 | Bauer et al. |
| 6,808,461 B2 | 10/2004 | Harris et al. |
| 6,858,659 B2 | 2/2005 | White et al. |
| 6,858,660 B1 | 2/2005 | Scheifers et al. |
| 6,994,723 B1 | 2/2006 | McMahon |
| 7,022,179 B1 | 4/2006 | Dry |
| 7,091,297 B2 | 8/2006 | Mather et al. |
| 7,104,317 B2 | 9/2006 | Richard et al. |
| 7,108,914 B2 | 9/2006 | Skipor et al. |
| 7,188,678 B2 | 3/2007 | Richard et al. |
| 7,279,523 B2 | 10/2007 | Ando et al. |
| 7,342,057 B2 | 3/2008 | Kumar et al. |
| 7,488,523 B1 | 2/2009 | Muncaster et al. |
| 7,524,914 B2 | 4/2009 | Mather et al. |
| 7,566,747 B2 | 7/2009 | Moore et al. |
| 7,569,625 B2 | 8/2009 | Keller et al. |
| 2001/0050032 A1 | 12/2001 | Dry |
| 2003/0017208 A1* | 1/2003 | Ignatious et al. ............ 424/486 |
| 2004/0116641 A1* | 6/2004 | Mather et al. ................. 528/28 |
| 2005/0156328 A1 | 7/2005 | Luo et al. |
| 2005/0187605 A1* | 8/2005 | Greenhalgh et al. ......... 623/1.15 |
| 2005/0245719 A1 | 11/2005 | Mather et al. |
| 2005/0272211 A1* | 12/2005 | Browne et al. ............... 438/296 |
| 2006/0169180 A1 | 8/2006 | Dry |
| 2006/0252852 A1 | 11/2006 | Braun et al. |
| 2007/0087198 A1 | 4/2007 | Dry |
| 2007/0166542 A1 | 7/2007 | Braun et al. |
| 2007/0264456 A1* | 11/2007 | Hood et al. .................. 428/41.5 |
| 2008/0047472 A1 | 2/2008 | Dry |
| 2008/0050612 A1 | 2/2008 | Dry |
| 2008/0053338 A1 | 3/2008 | Dry |
| 2008/0057296 A1 | 3/2008 | Dry |
| 2008/0058445 A1 | 3/2008 | Dry |
| 2008/0083286 A1 | 4/2008 | Danowski et al. |
| 2008/0097606 A1 | 4/2008 | Cragg et al. |
| 2008/0107888 A1 | 5/2008 | Dry |
| 2008/0113573 A1 | 5/2008 | Acosta et al. |
| 2008/0116415 A1 | 5/2008 | Wang et al. |
| 2008/0249221 A1 | 10/2008 | Corkery et al. |
| 2008/0249245 A1 | 10/2008 | Mather et al. |
| 2008/0287582 A1 | 11/2008 | Weiss |
| 2009/0227754 A1* | 9/2009 | Hasson et al. ................ 526/311 |

OTHER PUBLICATIONS

Dictionary.com—nanoparticles. http://dictionary.reference.com/browse/nanoparticle?s=t Retrieved in Dec. 11, 2012.*
Wamser—Organic Chemistry III, Chapter 23—Polymer. Retrieved on Jun. 25, 2013. http://web.pdx.edu/~wamserc/C336S99/23notes.htm.*
PPG Fiber Glass—Mat & Roving. Retrieved on Jan. 21, 2014. http://www.ppg.com/glass/fiberglass/products/Pages/matrovings.aspx.*
PSU—Chemistry 112—Supplementary Reading. Retrieved on Jan. 21, 2014. http://courses.chem.psu.edu/chem112/materials/polymers.html.*
Liu et al., "Review of progress in shape-memory polymers", Advance Article on the web Mar. 19, 2007.*
PolymerProcessing.com, polyethylene. 2001. http://www.polymerprocessing.com/polymers/PE.html.*
The Free Dictionary: node. Retrieved on Feb. 6, 2016. http://www.thefreedictionary.com/node.*
Merriam-Webster: Adjoin. Retrieved on Feb. 6, 2016. http://www.merriam-webster.com/dictionary/adjoin.*
International Searching Authority/US, International Search Report and Written Opinion dated Feb. 5, 2010 (6 pgs.).

* cited by examiner

A - A

SELF-HEALING PRODUCT

CROSS-REFERENCE TO RELATED APPLICATIONS

This application claims the benefit of priority under 35 U.S.C. §119(e) from U.S. Provisional Patent Application Ser. No. 61/140,402, entitled "Nanofiber-Based Nanocomposite Coating Exhibiting Thermal Mending" and filed on Dec. 23, 2008. The content of this application is incorporated herein by reference in its entirety.

TECHNICAL FIELD

The present invention relates generally to self-mending compositions, and in one particular embodiment, to a composition that comprises a fibrous microstructure of healing component interpenetrating a shape memory component to form a product with self-healing characteristics that are responsive to variations in the temperature.

BACKGROUND

Coatings and other material layers can serve a protective function when disposed on a substrate. These layers and coatings are often designed to prevent damage to the subjacent material. This damage can arise when the coating is abraded, impacted, scratched, gouged, and otherwise contacted in a manner deleterious to the material layer. Corrosion is also damaging, whereby materials (particularly metals) are deteriorated at their surfaces due to environmental influences such as, for example, aqueous exposure or immersion. Coatings are also used, most often in the form of paint, to combat and prevent corrosion.

Nonetheless, no coating is perfect and all coatings feature limited hardness, substrate adhesion, and environmental (chemical) durability. Consequently, any coating approach to prevent damage to materials, such as damaged caused by corrosion requires expensive maintenance procedures of periodic stripping and re-painting. Given the prevalence in our society of corrosion and associated protective coatings, the problem and its treatment can be very expensive.

Some solutions that prevent corrosion and related degradation issues utilize compositions that promote self-healing, and in particular self-healing of cracks, gouges, and gaps caused by deformation of the composition. These materials often comprise capsules of various shapes and sizes that are dispersed in a matrix-type material. These capsules contain various materials including monomers or liquid healing agents and catalysts, which are released in response to the destruction of the capsules at the location of the deformation of the coating. The released materials chemically interact with each other, as well as with the catalysts within the matrix material, to cause chemical reactions such as polymerization that can effect "healing" of the coating.

While such solutions can be used and formulated to provide an active, self-healing material, there are limitations to this capsule-based technology. For example, the capsule-based materials do not utilize an active crack closure mechanism. Rather these materials typically rely on the polymerization reactions to fill the deformation in the coating, thus facilitating closure of the crack. It is also likely that a single deformation (e.g., an abrasion or a gouge) in the material can effectively "heal" only once because the capsules are individually formed and located at discrete positions within the matrix. In other words, there are only a finite number of capsules available within the material matrix to promote the healing mechanism, in effect creating a coating that is non-reversible and incapable of repeated healing.

Moreover, the capsules themselves have a finite lifespan that is subject to decay over time. This limitation not only reduces the effective lifespan of the self-healing mechanism, but also reduces the effectiveness of manufacturing and application of batches of the capsule-based materials for use as, e.g., coatings, because the materials that utilize the capsules will only be effective if such manufacturing, application, and re-application is done within the life-span of the capsules, and necessarily the shelf-life of the product.

There is therefore a need for protective coatings that can be more easily repaired to their protective integrity, but that are suited for repeated deformation over a longer life-span. It is also desirable that embodiments of such protective coatings allow for the mending of scratches and cracks by virtue of their composition and microstructure so as to yield a combination of shape memory and rebonding that can be activated by a treatment, e.g., heat treatment.

SUMMARY

There is described below a product that comprises a shape memory component and a healing component in the form of a fibrous microstructure interpenetrating the shape memory component. This unique combination facilitates both self-healing of the product, and also extends the durability of the product by permitting the healing component to diffuse amongst various areas of the product. This diffusion facilitates the self-healing mechanism in areas of the product that are subject to deformation, including deformation that can occur more than once in the same area.

There is provided, for example, in one embodiment a self-healing product. This self-healing product can comprise a first material for storing strain energy, and a second material dispersed in the first material, the second material forming a plurality of fibers randomly oriented within the first material. The self-healing product can be further described wherein the second material is responsive to a treatment that causes the second material to diffuse within the first material.

There is also provided in another embodiment a self-healing product for use as a coating, in which the self-healing product can comprise a thermally-mendable composition comprising a shape memory component and a healing component mixed with the shape memory component. The self-healing product can further be described wherein the shape memory component can comprise a shape memory polymer for storing strain energy that is generated by deformation of the thermally-mendable composition, wherein the healing component can form a microstructure that can comprise a plurality of fibers interpenetrating the shape memory polymer, and also wherein each of the fibers can comprise a material that is responsive to a treatment that can cause the healing component to diffuse within the shape memory component.

There is further provided in yet another embodiment a method for restoring at least a portion of a self-healing product subjected to a deformation, in which the self-healing product can comprise a thermally-mendable composition. The method can comprise a step for releasing strain energy from a shape memory component of the thermally-mendable composition, and also a step for flowing through the self-healing product a healing component of the thermally-mendable composition. The method can further be described wherein the healing component can be interpenetrated as a plurality of fibers with the shape memory component to form a microstructure in the self-healing product, and also wherein each of the fibers can comprise a material that is responsive to a treatment that can cause the healing component to diffuse within the shape memory component.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION

Figure 1:
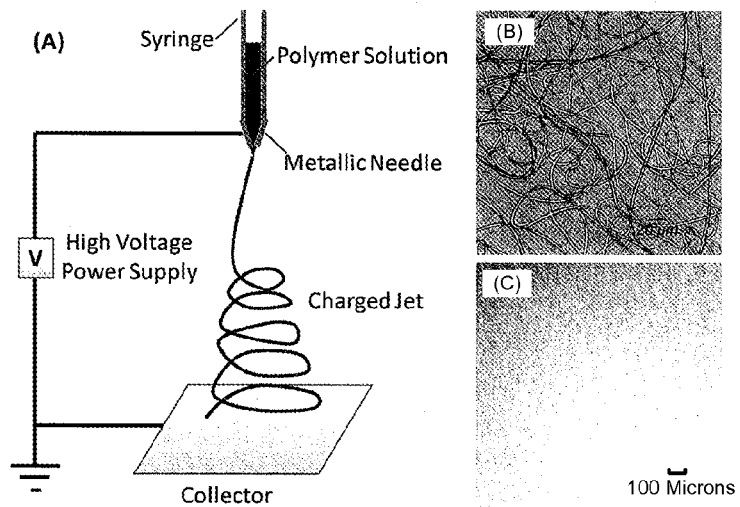
FIG. 1 is a representation of FIG. 1 of Provisional Patent Application No. 61/140,402, which is a schematic representation of an electro-spinning process, a transmission optical micrograph of electro-spun fibers, and a reflective optical micrograph of a fibrous coating produced by electro-spinning.

In accordance with its major aspects and broadly stated, the present invention comprises concepts that improve the performance of self-healing materials such as by adapting such materials to not only close defects (e.g., gaps) caused by deformation of the material, but also to seal the closed gap in a manner that substantially restores the physical properties of the material as before the deformation. There is provided in the discussion below, for example, embodiments of a self-healing product that can comprise a shape memory component for storing strain energy caused by the deformation, and a healing component dispersed as fibers in the shape memory component. These fibers form a network that interpenetrates the shape memory component to form a complex, randomly-oriented microstructure. This configuration, which can comprise the shape memory component and the interpenetrating network of the healing component, provides a mechanism for "healing" defects in the product, wherein this mechanism in some embodiments creates a thermally-mendable composition that can be responsive to changes in the temperature of the self-healing product.

The variations in temperature can in one embodiment cause the shape memory component to release the stored strain energy, cause the healing component to diffuse into the closed defect, and cause the healing component to solidify (or recrystallize) thereby providing the mechanism for "healing." The dispersion of the interpenetrating network of "healing" fibers is particularly beneficial because, unlike the materials described in the Background above, the fibrous structure can provide among other benefits a greater concentration (or volume) of healing component at the site of the defect. Moreover, the inventors have discovered that the combination of the shape memory component and the healing component as fibers can provide a self-healing product that can withstand repeated defects as the result of deformation in the same general area of the product because the interpenetrating network permits the healing component to diffuse from other parts of the product to the defect site.

Details of the healing mechanism, the organization of compositions of the self-healing product, as well as other concepts and aspects of the present invention, briefly outlined above, were disclosed in Provisional Patent Application No. 61/140,402. Portions of this application (hereinafter, "the provisional text") are reproduced immediately below and in FIGS. 1-3 of the present disclosure:

Self-Healing Materials. It will become apparent that our invention falls into the new class of materials termed "self-healing". As such, a brief background on self-healing materials is warranted. Substantial efforts have been undertaken to incorporate self-healing phenomena within polymeric materials as a built-in material functionality, inspired by biological systems where specific mechanisms can be triggered to automatically repair damage (so-called "self-healing"), thereby restoring strength and function. One of the approaches is to initiate a specific chemical reaction, usually polymerization, locally at the damage site. This requires the incorporation of microscopic "containers" that host the reactive species and prevent them from pre-damage reaction. In this approach, the reactive monomer is released upon rupturing of the container during the propagation of a crack. Subsequent flow leads to contact with a catalyst or hardener, either dispersed in the resin matrix or from other ruptured containers, and initiation of healing polymerization. Despite the sophistication in chemistry and manufacturing, this capsule approach has been quite successful in achieving high self-healing efficiencies, and is applicable to various types of polymeric materials including fiber-reinforced composites, composite sandwich structures, and elastomers.

Our own group has recently elaborated a self-healing approach for bulk materials, involving a "differential expansive bleeding" (DEB) phenomenon we discovered for thermoset/thermoplastic blends undergoing polymerization induced phase separation (PIPS) to yield a bricks-and-mortar microstructure. The DEB phenomenon is important to the present invention and thus bears some further explanation. In particular, this phenomenon involves the selective thermal expansion of one phase in an interpenetrating two-phase composite. This thermal expansion is particularly marked if one phase undergoes a melting transition, as the step change in specific volume at the melting transition of a polymer can be as large as 20%. As a consequence of one phase expanding and the other interpenetrating phase not expanding, heating of the specimen leads to "bleeding" of the expanding phase to free surfaces, including cracks. Our previous PIPS system achieved such interpenetrating phases with a non-expanding epoxy phase and an expanding poly (ε-caprolactone) phase. This system showed good thermal mending of cracks in bulk specimens. The present invention involves an alternative approach to achieve a similar microstructure, but with direct control over phase scale and applicability to processing as a coating by an electrospraying process. This process would be readily adopted by coating practitioners.

Nanofiber-Based Nanocomposites. The present invention utilizes a microstructure that was produced and published on in using different materials and for a completely different purpose: fuel cell membranes. In our prior work, we conceived a process to make interpenetrating polymer nanocomposite. In that case, the fibers were proton-conducting while the matrix provided a chemical barrier separating fuel and oxidizer in the proton-exchange membrane. The process involved several step: (i) electrospinning a nanofiber mat of an ion-exchange polymer, (ii) compacting the mat to increase the volume density of fibers in the final membrane, (iii) forming polymer welds between intersecting fibers to create a three-dimensional interconnecting network, and (iv) filling the void space between fibers with an inert polymer. Our current invention applies this process to the formation of thermally-mendable polymer coatings (instead of membranes in the prior art) through achievement of the required interpenetrating two-phase structure amenable to the DEB phenomenon by proper material selection.

Our thermally-mendable coating can be applied to a substrate surface via a two step process. First, a low melting point thermoplastic polymer is directly electrospun onto the surface (FIG. 1 (A)). This process yields ultra-thin fibers (with diameters in nano-/micrometer scale) with random orientation covering the surface. FIG. 1 (B) and (C) shows the transmission optical micrograph of the fibers and the reflective optical micrograph of a dense fibrous coating produced by this process, respectively. Second, a photocurable polyurethane (PU) based liquid resin is applied onto the fibrous layer, followed by solidification via UV curing.

Figure 2:
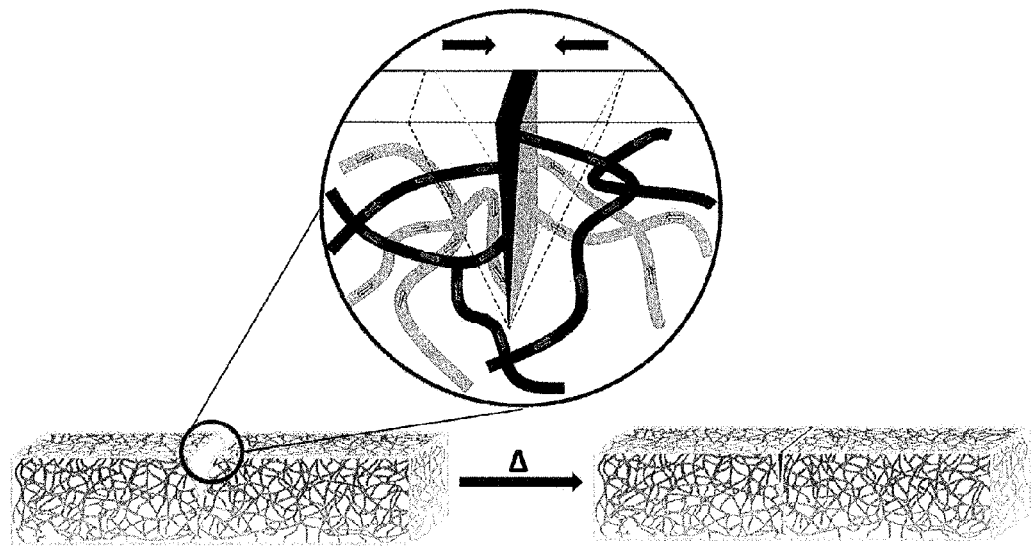
FIG. 2 is a representation of FIG. 2 of Provisional Patent Application No. 61/140,402, which is a schematic illustration of a self-healing product.
Figure 3:
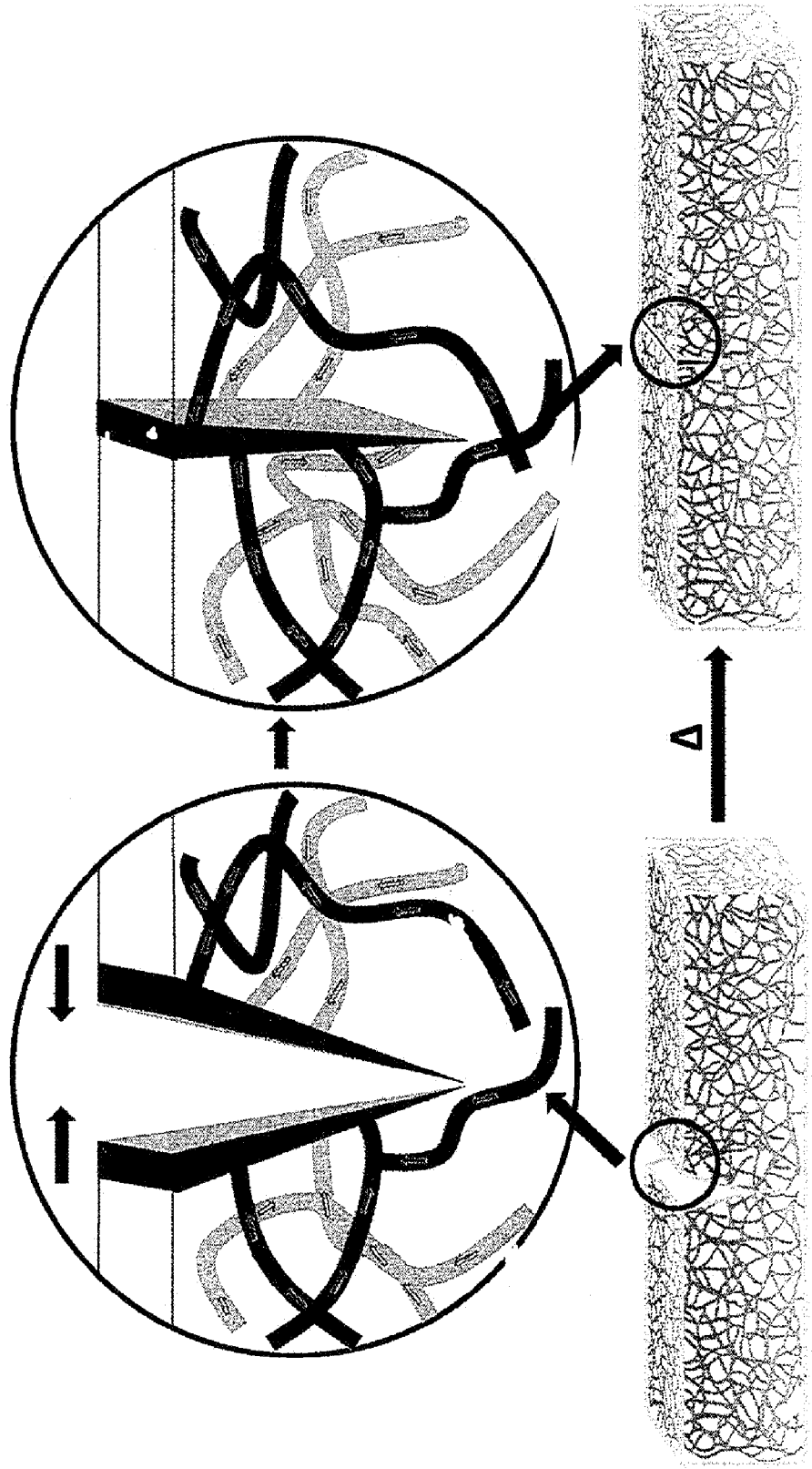
FIG. 3 is a representation of FIG. 3 of Provisional Patent Application No. 61/140,402, which is a schematic illustration of a self-healing product.

The aforementioned coating system features a novel thermally induced self-healing mechanism that tackles most of the damage scenarios for coatings. When coating is damaged, it is often deformed (deviating from its original shape) and cracked with actual loss of the coating material (scratches), leaving a "gap" or exposing the substrate surface. This if not taken care of properly, not only leads to aesthetic displeasure but may also initiate more severe damage such as delamination or corrosion. For most commercial coatings the only way to repair them is to remove the original coating and re-coat the surface, which is both labor- and cost-intensive. In contrast, our coating system features a "self-healing"—or thermally-mendable—mechanism that only requires a one-step heating treatment. This is illustrated in FIGS. 2 and 3. The PU coating is a shape memory polymer that can effectively store strain energy during deformation inflicted during damage (whether impact, scratching, or general wear). Upon heating above its glass transition temperature ($T_g$) by convection (heating gun) or conduction (through the substrate) the coating can release the stored strain energy and reverse the deformation. Heating also causes the thermoplastic fibers to melt and diffuse through the channels to fill the gap, through the DEB process described above. Subsequent recrystallization of the thermoplastic component will restore the mechanical integrity and protective properties of the coating and prevent any further damage to happen. The whole procedure is easy to conduct and can be accomplished in a very short time (seconds to minutes).

As discussed in the provisional text provided above, at least one embodiment of the present invention "features a novel thermally induced self-healing mechanism." This mechanism is set forth and discussed in context of particular components that are selectively integrated to facilitate the development of a product wherein the self-healing mechanism "requires a one-step heating treatment." Focusing on these components, because it was identified by example that the product can comprise a shape memory polymer, it is clear from the discussion above that embodiments of the product can comprise a component (or shape memory component) that can be any one of a variety of materials that can effectively store and release the strain energy caused by deformation from, e.g., impacting, scratching, and abrading of the self-healing product.

In one embodiment, the shape memory component, when heated to at least its glass transition temperature ($T_g$), can release the stored strain energy and reverse the deformation in the self-healing product. Examples of materials for use as the shape memory component include, but are not limited to shape memory polymers such as polyurethane. One example the self-healing product can comprise a photocurable polyurethane resin, which can be solidified under ultraviolet ("UV") light.

There is also identified by example in the provisional text that the product can not only comprise a thermoplastic component, but also that such component is useful to "restore the mechanical integrity and protective properties of the [product] and prevent any further damage to happen." It follows in context of the provisional text above that such component facilitates the healing characteristics of the product, and more particularly that this component (or healing component) can be any one of a variety of materials that can flow at low viscosity form (e.g., liquid) throughout the shape memory component when heated to at least its melting temperature ($T_m$).

Examples of the healing component can comprise polymers such as thermoplastic polymers, compositions, and blends. These polymers can comprise, for example, semicrystalline polymers capable of melting, low-melting point thermoplastic polymers, and in one particular construction of the self-healing product the selected polymer can be amenable to deposition on a substrate via electro-spinning, electro-spraying, and similar processing techniques. The polymers for the healing component can likewise be selected so that these techniques can form fibers such as fibers of particularly small dimensions, e.g., fibers with diameters on the order of nanometer and micrometer scales.

Referring to FIG. 1 of the present application, as well as to the provisional text provided above, it is seen that the fibers are the result of such electro-spinning process. With more particular reference to the micrographs of FIG. 1, it is seen that these fibers can be randomly oriented within the self-healing product thereby improving the density and interconnectivity of the fibers. This orientation also provides the interpenetrating network of fibers with a topology wherein each of the fibers adjoin a plurality of other fibers within the interpenetrating network. This topology can facilitate diffusion of the healing component throughout the self-healing product.

Additional examples of materials and compositions for use as the shape memory component and the healing component are provided in connection with the EXEMPLARY IMPLEMENTATIONS section provided and discussed in more detail below. In addition to such material examples, it is also further provided in the EXPERIMENTAL EXAMPLE at least one embodiment of a self-healing product that is made in accordance with the present invention. Before discussing such implementations and examples, however, further details of self-healing products made in accordance with concepts of the present invention are discussed below in connection with the exemplary self-healing products shown in FIGS. 4-7.

Figure 4:
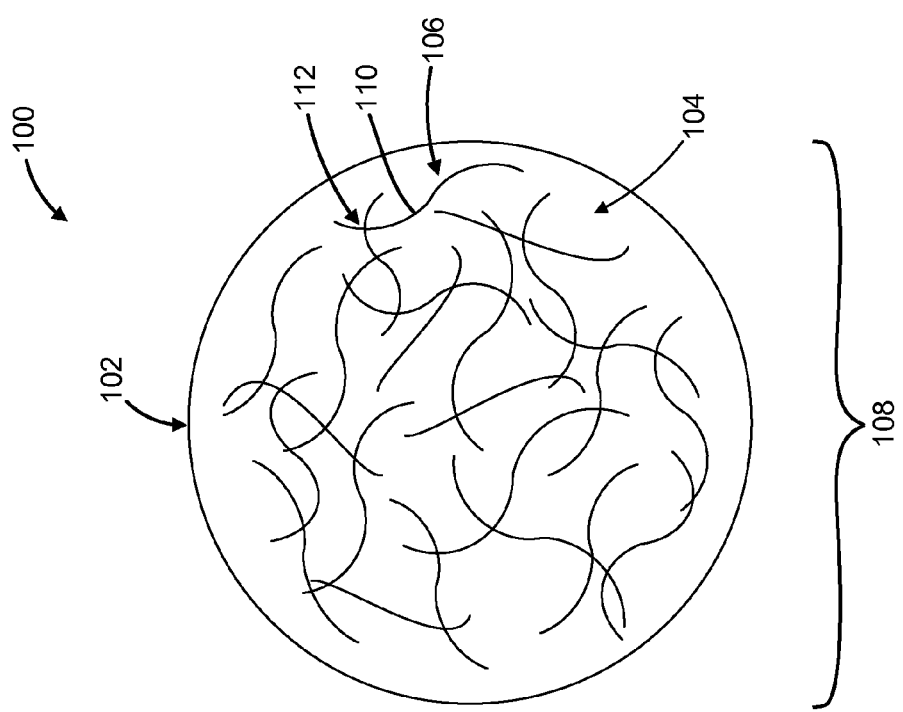
FIG. 4 is a side, cross-section view an example of a self-healing product that is made in accordance with concepts of the present invention.

One embodiment of the self-healing products of the present invention can be had with reference to the example that is shown in FIG. 4, which incorporates features and concepts similar to those illustrated and provided in the provisional patent application as FIGS. 2-3 herein. In FIG. 4, it is shown that a self-healing product 100 can comprise a composition 102 with a shape memory component 104 and a healing component 106 dispersed in, and intermixed with the shape memory component 104. The healing component 106 can form an interpenetrating network 108 with a plurality of fibers 110 that can be adjoined, such as at nodes 112 of the interpenetrating network 108. The adjoined nodes 112 can permit the healing component 106 to diffuse throughout the interpenetrating network 108 (and generally the self-healing product 100).

In one embodiment, diffusion can occur when the self-healing product 100 is heated to temperatures above a transition temperature for one or more of the components in the self-healing product 100. The transition temperature can comprise the glass transition temperature ($T_g$) and/or the melting temperature ($T_m$) of one or both of the shape memory component 104 and the healing component 106. The relationship between the transition temperatures for the various materials can vary such as in accordance with the type of materials selected for the self-healing product 100. In one embodiment, each of the $T_g$ and the $T_m$ for the components can be individually tuned to generate self-healing products that are beneficial or compatible with particular applications, e.g., coatings on an optical lens. In one example, the $T_g$ of the shape memory component 104 may be less than the $T_m$ of the healing component 106. In another example, the $T_g$ of the shape memory component 104 may be greater than the $T_m$ of the healing component 106.

Figure 5:
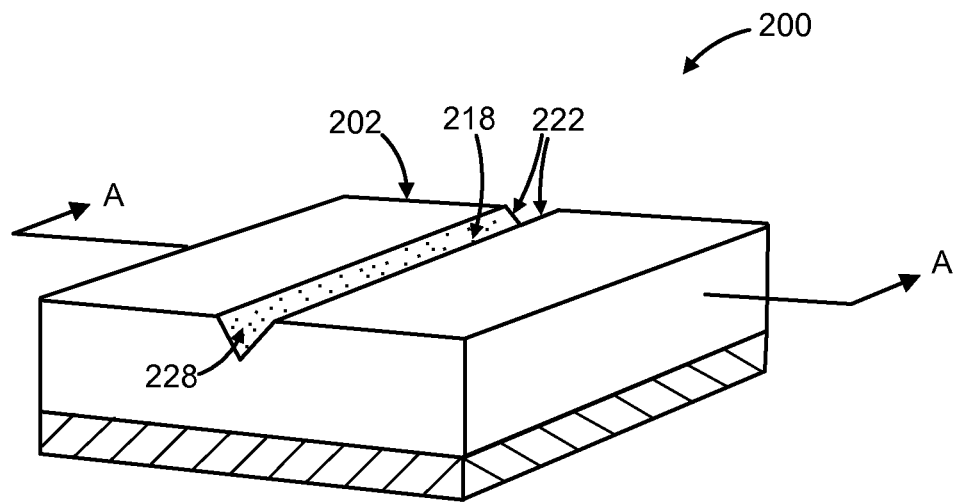
FIG. 5 is a side, perspective view of another example of a self-healing product comprising a substrate to form a coating that is made in accordance with concepts of the present invention.
Figure 6:
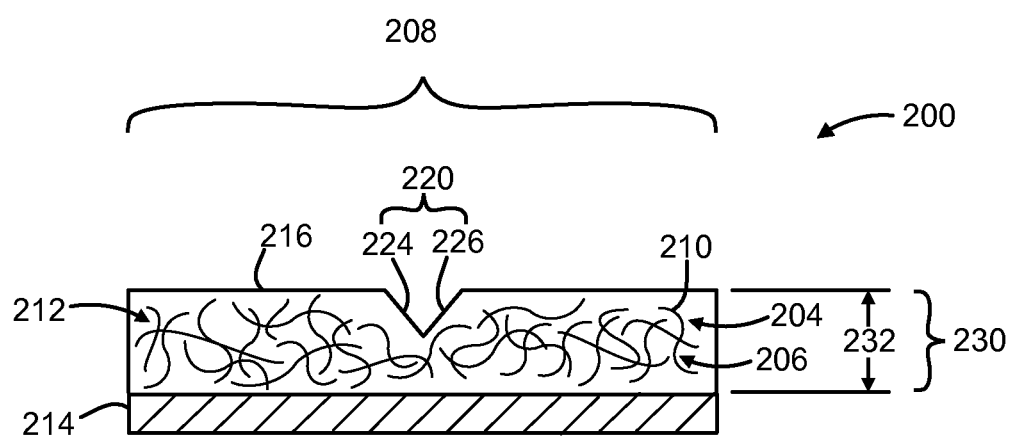
FIG. 6 is a side, cross-section view of the self-healing product of FIG. 5.

By way of non-limiting example, and to clarify this and other features of the self-healing products disclosed herein, reference can be had to the example of the self-healing product 200 illustrated in the perspective and detailed views that are shown in FIGS. 5 and 6. Like numerals are used to identify like components as between FIGS. 4, 5 and 6, but the numerals are increased by 100 (e.g., 100 is now 200 in FIGS. 5 and 6). For example, it is shown in the example of FIG. 5 that the self-healing product 200 can comprise a shape memory component 204, a healing component 206, and an interpenetrating network 208 of fibers 210 that adjoin at nodes 212.

It is also shown in this example that the self-healing product 200 can comprise a substrate 214 and an exposed surface 216. For purposes of exemplifying the healing mechanism mentioned above, the self-healing product 200 also comprises a deformation 218 such as a crack or abrasion that penetrates the exposed surface 216 and extends towards the substrate 214 into the self-healing product 200. The deformation 218 can form a gap 220 that is bounded by a pair of opposing gap surfaces 222, such as a primary gap surface 224 and a secondary gap surface 226. The primary gap surface 224 and the secondary gap surface 226 can comprise a plurality of terminated fibers 228 each of which can comprise, for example, the healing component 206 in its solidified (non-flowing, and/or non-diffusing) form.

Substrates of the type used as the substrate 214 can be a variety of materials on which can be deposited one or more of the shape memory component 204 and the healing component 206. These substrates can include metals, plastics, glass, and other materials with surfaces receptive to the self-healing product 200. In one example, the self-healing product 200 is deposited on the substrate 214 to form a coating 230 with a thickness 232 selected for protecting the substrate 214 from, e.g., corrosion. In another example, the coating 230 is configured as an optical coating, wherein the substrate 214 can be an optical material such as a lens, a lens assembly, or other material with optical properties for use, e.g., as lenses of eyeglasses.

The terminated fibers 228 can, in one example, populate the surfaces 224, 226 to provide extensive coverage of the surfaces 224, 226 with the material of the healing component 206. This coverage can be related to the microstructure of the interpenetrating network 208 within the shape memory component 204. The microstructure can be quantified by certain measures such as the average diameter of the fibers 210, the density of the fibers 210 as per a volume of the self-healing product 200, and also as measured in terms of the number of terminated fibers 228 as per the area of the surfaces 224, 226 that are exposed by the deformation 218.

The extensive coverage of the surfaces 224, 226 with terminated fibers 228 is particularly beneficial to the healing mechanism of the self-healing products such as self-healing product 200. The inventors have discovered, for example, that this coverage can be facilitated through the formation of the interpenetrating network 208 of fibers 210 using one or more of the deposition techniques discussed above. Unlike other self-healing materials, this formation improves the healing mechanism because the interpenetrating network 208 permits the healing component 206 to diffuse to the area of the deformation 218 from areas of the self-healing product 200 that are remote from the deformation 218.

In one embodiment, the diffusion related to the interpenetrating network 208 dispersed in the shape memory component 204 can exploit a differential expansive bleeding ("DEB") mechanism. This DEB mechanism can involve the selective thermal expansion of one phase in an interpenetrating two-phase composition such as the composition of the shape memory component 204 and the healing component 206 of the present invention. This thermal expansion is particularly marked if one phase (e.g., the healing component 206) undergoes a melting transition, and in one particular constructions of the self-healing product 200 materials for use as the healing component 206 can exhibit a step change in specific volume at the melting transition of as large as about 20%. In one example, as a consequence of the healing component 206 expanding and the other interpenetrating phase (e.g., the shape memory component 204) not expanding, heating of the specimen leads to "bleeding" of the healing component 206 to free surfaces, including those surfaces of cracks and gaps such as surfaces 224, 226 that are shown in FIG. 5.

Figure 7:
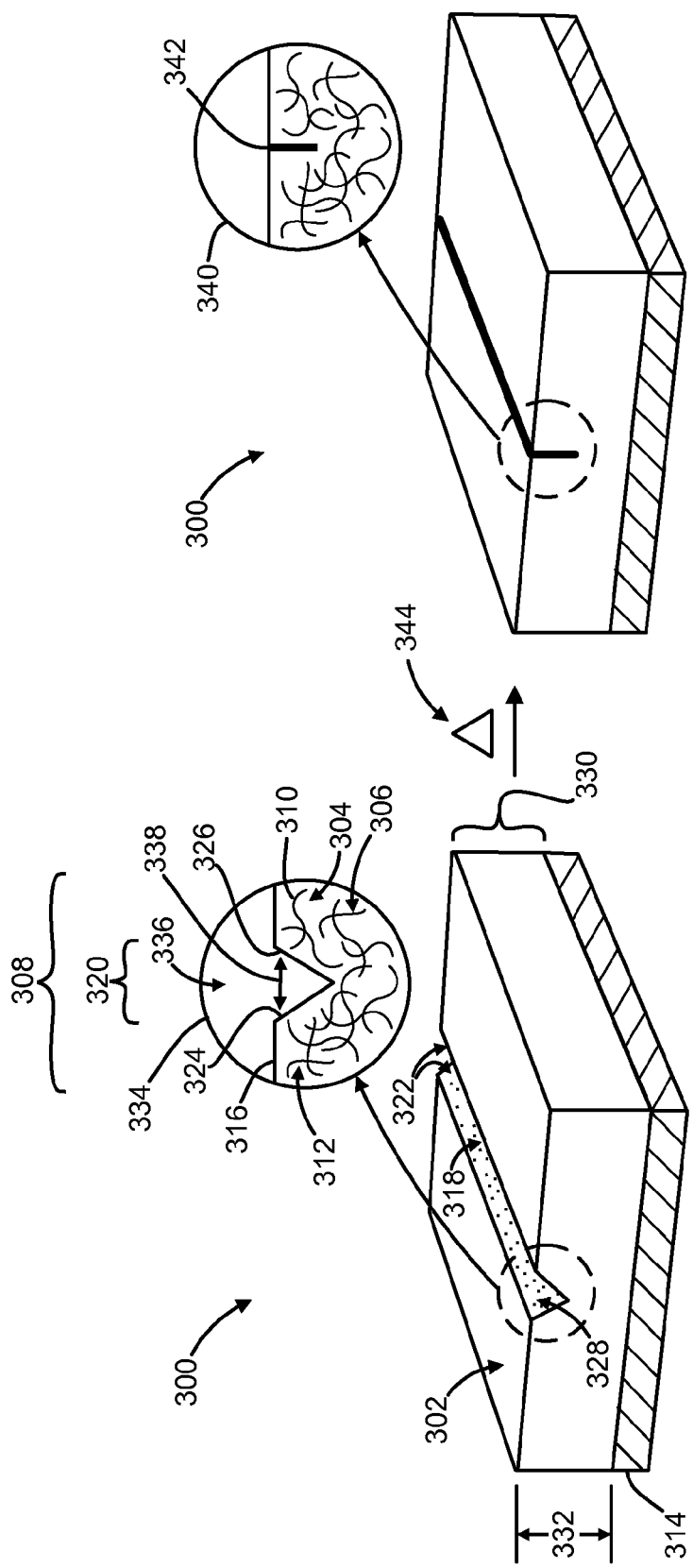
FIG. 7 is a side, perspective view and side, cross-section, detailed view of yet another example of a self-healing coating that is made in accordance with concepts of the present invention.

To further exemplify the healing mechanism of such self-healing products, as well as the DEB mechanism and other concepts of the present invention, reference can now be had to the example of the self-healing product 300 that is shown in FIG. 7. Again like numerals are used to identify like components as between FIGS. 5, 6, and 7 (e.g., 200 is now 300 of FIG. 7), so discussion of such like components is omitted unless necessary for further clarification of the concepts described herein. At a high level, it is seen that the self-healing product 300 comprises a deformation 318 that forms a gap 320, which in the present example is illustrated in an open state 334 with an opening 336 that has an opening dimension 338. The gap 320 is also shown in a healed state 340 that can have a diffused material 342 disposed therein, and which is different from the open state 334 as a result of a treatment 344.

More particular to the example of FIG. 7 each of the open state 334 and the healed state 340 generally describe and/or identify one or more states of the self-healing product 300. The open state 334 can result from deforming activity such as cracking. In the open state 334, for example, the opening 336 can be substantially devoid of material such as would be consistent with a crack or gouge in the self-healing product 300. The healed state 340 can occur after the healing mechanism is activated such as by the treatment 344, which facilitates the "healing" of the self-healing product 300. In the healed state 340, it is shown in FIG. 7 that the gap 320 comprises the diffused material 342, which as discussed immediately below comprises the healing component 306 that diffuses into, and fills the gap 320 as part of the healing mechanism of embodiments of the self-healing product 300.

In one embodiment, the treatment 344 comprises application of heat to the area of the deformation 318. Other treatments are likewise contemplated, and more examples of such treatments are provided in the exemplary implementations discussed below. With respect to the present example, however, the treatment 344 can change the temperature of the self-healing product 300 in such a way as to cause the shape memory component 304 to release the stored strain energy that results from the deforming activity. This release causes relative movement of the surfaces 324, 326. Such movement effectively closes the opening 336, as is evident and illustrated by the change in the opening dimension 338 between the open state 334 and the healed state 340 of the present example.

The change in temperature of the self-healing product 300 can also cause the healing component 306 to change phase (e.g., melt, and/or liquefy) so as to permit the healing component 306 to diffuse into the gap 320 as the diffused material 342. This diffusion can occur as a result of the DEB mechanism discussed above. In one example, the diffused material 342 can change phase inside of the gap 320, such as by solidification or recrystallization. This change of phase can result from a change in the treatment 344, wherein one particularly construction of the self-healing product 300 can be configured so that the healing component 306 changes phase when the heat is removed and/or reduced. This recrystallization can restore the mechanical integrity and properties of the self-healing product 300.

EXEMPLARY IMPLEMENTATIONS

To further clarify and describe concepts within the scope and spirit of the present disclosure, reference is now directed to the exemplary implementations that are discussed and described below. The implementations can comprise some or all of the features described in connection with the self-healing products 100, 200, 300 discussed above, as well as additional features, compositions, materials, and the like. Further description of some of the concepts provided in the embodiments above are also provided below, wherein this description is meant to supplement and enhance the scope and content of the prior discussion of the self-healing products 100, 200, 300.

For example, and to provide a clear and consistent understanding of the specification and the claims, it is understood that a polymer and/or polymeric materials (hereinafter, "polymers") such as those used in the self-healing product can be substances that can comprise repeating structural units, and in one example the polymers can contain more than 100 repeating units. Polymers can also include those materials that comprise soluble and/or fusible molecules having long chains of repeat units. Polymers such as the polymers contemplated herein can also include materials that comprise insoluble and infusible networks.

Examples of materials that are suited for use as the shape memory component can comprise, but are not limited to, covalently cross-linked amorphous polymers, covalently cross-linked semi-crystalline polymers, physically cross-linked polymers with amorphous switching phase, and physically cross-linked polymers with semi-crystalline switching phases. Further specific examples of materials of these types of polymers are discussed in more detail below. Additional details, examples, and embodiments of polymers for use as the shape memory component can likewise be found as discussed by Mather et al. in *Review of Progress Shape-memory Polymers, J. Mater. Chem.*, 2007, 17, 1543-1558, which is incorporated herein by reference in its entirety.

Covalently cross-linked amorphous polymers (hereinafter "the Class I materials") can feature a sharp $T_g$ at the temperature of interest and rubber elasticity above $T_g$, which can be derived from covalent cross-links. One example of the Class I materials can be a chemically cross-linked vinylidene random copolymer consisting of two vinylidene monomers (one being methyl methacrylate and the other butyl methacrylate). Another example of the Class I material can be a chemically cross-linked polymer wherein $T_g$ that is greater than room temperature and with ultra-high molecular weight such as greater than $10^6$ g mol$^{-1}$. Yet another example of the Class I material can be polynorbornene ("PN"), compositions of which can have a $T_g$ of about 40° C. One particular example of PN is Norsorex® manufactured and sold by Zeon Chemicals Inc. of Louisville, Ky. Still another example of the Class I materials can be high molecular weight poly(methyl methacrylate) ("PMMA") which can have a $T_g$ of about 105° C. Still yet other examples of the Class 1 materials can comprise poly(alkyl methacrylate) copolymers; polystyrene copolymers; filler-modified epoxy networks; chemically cross-linked amorphous polyurethanes; poly((methyl methacrylate)-co-(N-vinyl-2-pyrrolidone))-PEG semi-IPNS; HDI-HPED-TEA networks; biodegradable copolyester-urethane networks; copolyester (e.g., with $T_g$ from about 48° C. to about 66° C.); P(AA-co-MMA)-PEG (e.g., with $T_g$ of about 60° C.); corn oil copolymer (e.g., with $T_g$ from about 0° C. to about 90° C.); PMMA-PBMA copolymers (e.g., with $T_g$ from about 20° C. to about 110° C.); expoxy (e.g., with $T_g$ from about 50° C. to about 80° C.); fish oil copolymers (e.g., with $T_g$ from about 30° C. to about 90° C.); PET-PEG copolymer (e.g., with $T_g$ up to about 80° C.), P(MA-co-MMA)-PEG (e.g., with $T_g$ from about 50° C. to about 90° C.); soybean oil copolymers with styrene and DVB (e.g., with $T_g$ from about 30° C. to about 110° C.), styrene copolymer; thermosetting PU (e.g., with $T_g$ from about 0° C. to about 150° C.); and, dehydrochlorinated cross-linked PVC (e.g., with $T_g$ of about 80° C.), as well as any combinations, derivations, and compositions thereof suited for use as the shape memory component of the self-healing products contemplated herein.

Covalently cross-linked semi-crystalline polymers (hereinafter, "the Class II materials") can feature characteristics of compliance below critical temperatures. Examples of the Class II materials can comprise bulk polymers such as semi-crystalline rubbers, liquid-crystal elastomers ("LCEs"), and hydrogels with phase separated crystalline microdomains. One example of the Class II materials can be chemically cross-linked trans-polyisoprene ("TIP"), compositions of which can have a $T_m$ of about 67° C., a degree of crystallinity around about 40%, and a stiffness of about 100 MPa at room temperature. Another example of the Class II materials can be chemically cross-linked semi-crystalline trans-polyoctenamer (polycyclo-octene) ("PCO"), compositions of which can have a trans content of about 80%, a $T_g$ of 70° C., and a $T_m$ of about 58° C. Yet other examples of the Class II materials can comprise poly-caprolactone (e.g., with $T_m$ from about 54° C. to about 58° C.); EVA+nitrile rubber (e.g., with $T_g$ of about 85° C.); PE (e.g., with $T_m$ of about 120° C.); polycyclo-octene (e.g., with $T_g$ of about 45° C.); PCO-CPE blends (e.g., with $T_m$ of about 58° C.); PCL-BA copolymer (e.g., with $T_g$ of about 45° C.); poly (ODVE)-co-BA (e.g., with $T_m$ of about 42° C.); EVA+CSM (e.g., with $T_m$ of about 80° C.), as well as any combinations, derivations, and compositions thereof suited for use as the shape memory component of the self-healing products contemplated herein.

Physically cross-linked polymers with amorphous switching phase (hereinafter, "the Class III materials") generally display rheological characteristics amenable to facile processing with conventional thermoplastic technology. One example of the Class III materials can be a melt-miscible blend of poly(vinyl acetate) ("PVAc") and poly(lactic acid) ("PLA"). Another example of the Class III material can be block copolymers and polyurethanes, compositions of which can be formed as a miscible blend of a thermoplastic polyurethane with phenoxy resin in which the soft segment of the polyurethane is PCL. Yet another example of the Class III materials can comprise norbornene that is copolymerized with polyhedral oligosilsesquioxane (norbornyl-POSS) hybrid monomer. Still other examples of the Class III materials can comprise miscible blends of PVAc with PLA and PVAc; miscible blends of PMMA with poly(vinyldiene fluoride) ("PVDF"); PLA-co-poly(glycolide-cocaprolactone); PLA-HA composites; low crystallinity, semi-crystalline homopolymers; POSS telechelic; PLAGC multiblock copolymer; aramid/PCL; PVDF/PVAc blends; poly(ketone-co-alcohol); PCL-b-ODX; PLA/PVAc blends; poly(1-hexadecene)-co-PP; PE-co-PMCP; POSS-PN block copolymer; PA-PCL; PET-co-PEO; PE-co-Nylon 6; PS-TPB, as well as any combinations, derivations, and compositions thereof suited for use as the shape memory component of the self-healing products contemplated herein.

Physically cross-linked polymers with semi-crystalline switching phases (hereinafter, "the Class IV materials") can be characterized by their soft domain crystallizing and, instead of $T_g$, the $T_m$ of these materials function as the shape-memory transition temperatures. One example of the Class IV materials can be a multi-block polyurethane featuring PEO as the soft segment. Another example of the Class IV materials can be styrene-trans-butadiene-styrene ("STBS") triblock copolymers. Yet another example of the Class IV materials can be thermoplastic segmented polyurethanes with semi-crystalline flexible segments. Still other examples of the Class IV materials can comprise POSS (e.g., with $T_g$ of about 45° C.); 4,4'-dihydroxybiphenyl ("DHBP") (e.g., with $T_g$ from about 50° C. to about 60° C.); 1,6-HD (e.g., with $T_g$ from about 40° C. to about 53° C.); 1,4-Butanediol (e.g., with $T_g$ from about 10° C. to about 50° C.); 1-4-Butane glycol, ethylene glycol bis(2-hyrdoxyethyl)hydroquinone, bisphenol A+ethylene oxide, bisphenol A+propylene oxide (e.g., with $T_m$ up to about 50° C.); 1,4-BD (e.g., with $T_m$ of about 25° C.); BEBP or BHBP (e.g., with $T_m$ from about 57° C. to about 63° C.); DHDP (e.g., with $T_m$ of about 40° C.); BD+DMPA (e.g., with $T_m$ of about 50° C.), as well as any combinations, derivations, and compositions thereof suited for use as the shape memory component of the self-healing products contemplated herein.

In one embodiment, suitable polymers for use as the shape memory polymer can comprise shape memory polyurethanes ("SMPU") such as the photocurable polyurethane discussed above. These SMPUs can comprise SMPUs wherein optimized shape memory effects can be obtained at a hard-segment content of 35 to 40 wt % for glassy thermoplastic SMPUs. These shape memory effects can also be obtained in other SMPUs at a soft-segment molecular weight of 5000-6000 g mol$^{-1}$ for semi-crystalline SMPUs.

Other examples of SMPUs can also incorporate rigid aromatic structures and/or more planar molecules, which improve shape memory performances owing to stronger molecular interactions. Still other examples of SMPUs can comprise conductive inorganic fillers. These fillers can include aluminum nitride ("AlN") particle to improve the thermal conductivity, such as for example SMPUs with about 40 wt % loading. Other inorganic fillers can also comprise glass fibers, Kevlar fibers, SiC particles, and carbon nanotubes ("CNTs").

Examples of materials for use as the healing component can comprise semi-crystalline and amorphous polymers that have a thermal transition that mobilizes the polymer to a fluid state. In one embodiment, these polymers can be selected so that the transition temperature at this thermal transition are within ±50° C. of the shape memory recovery temperature of the shape memory component, with various examples of the self healing product having polymers with transition temperatures within at least one of ±5° C., ±10° C., and ±25° C. of the shape memory recovery temperature. Examples of polymers that can be used can comprise polyacrylates, polymethacrylates, polyesters, among as well as any combinations, derivations, and compositions thereof suited for use as the shape memory component of the self-healing products contemplated herein.

EXPERIMENTAL EXAMPLE

The following non-limiting example has been carried out to illustrate one or more embodiments of the self-healing product made in accordance with the concepts of the present invention.

Figure 8:
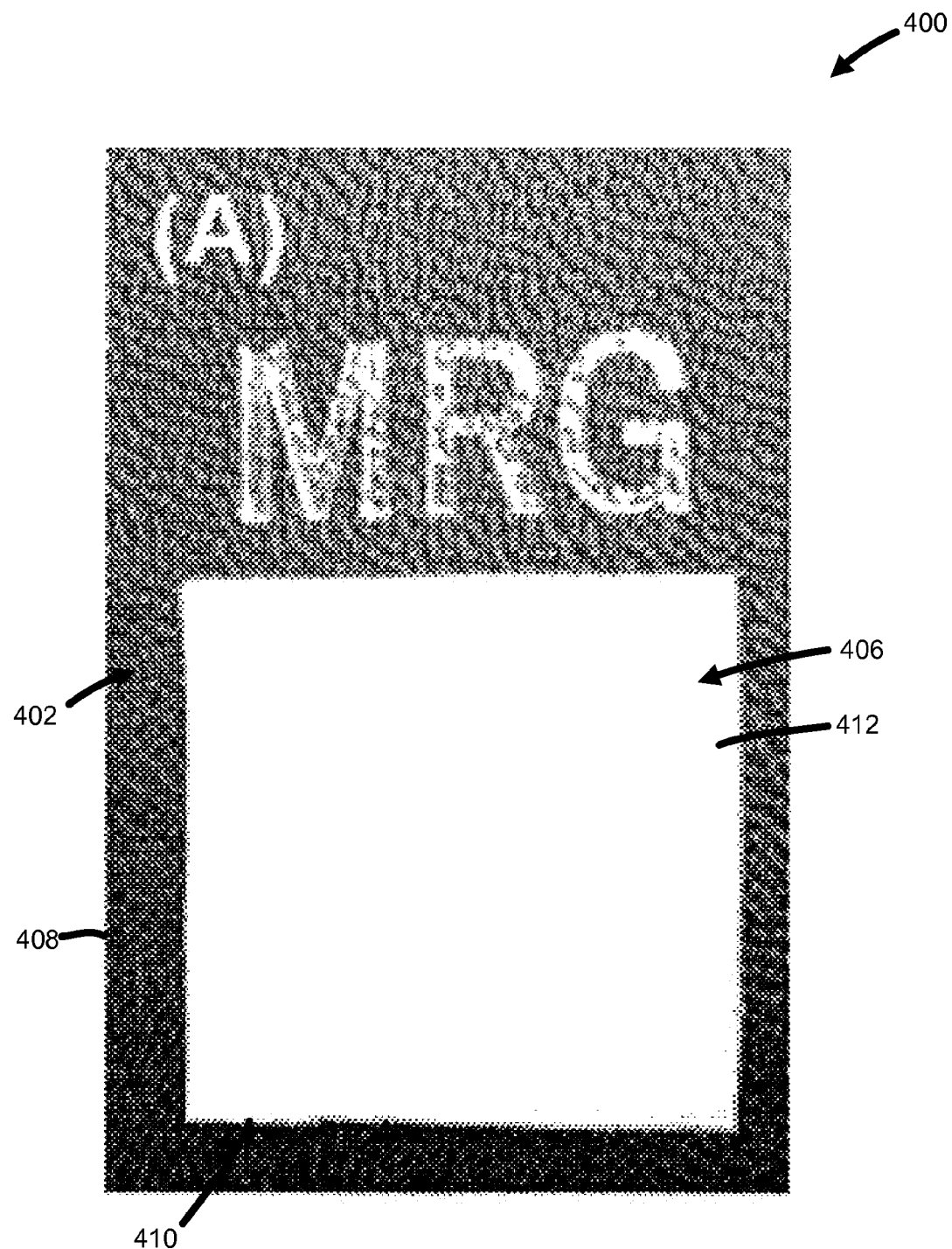
FIG. 8 is a photograph of an example of a healing component after deposition of the healing component on a substrate in accordance with concepts of the present invention.
Figure 9:
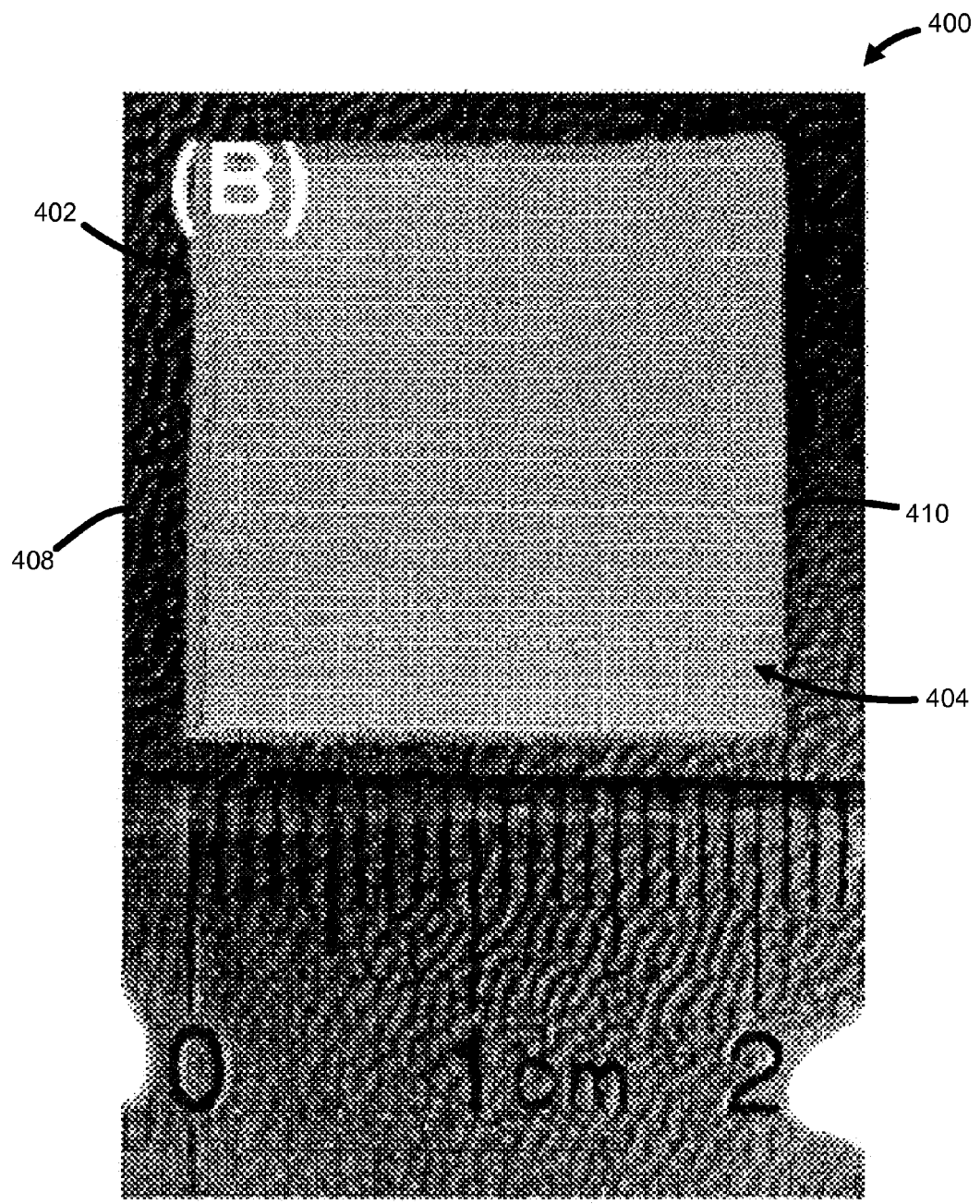
FIG. 9 is a photograph of still another example a self-healing formed product after interpenetrating a shape memory component with the healing component of FIG. 8.
Figure 10:
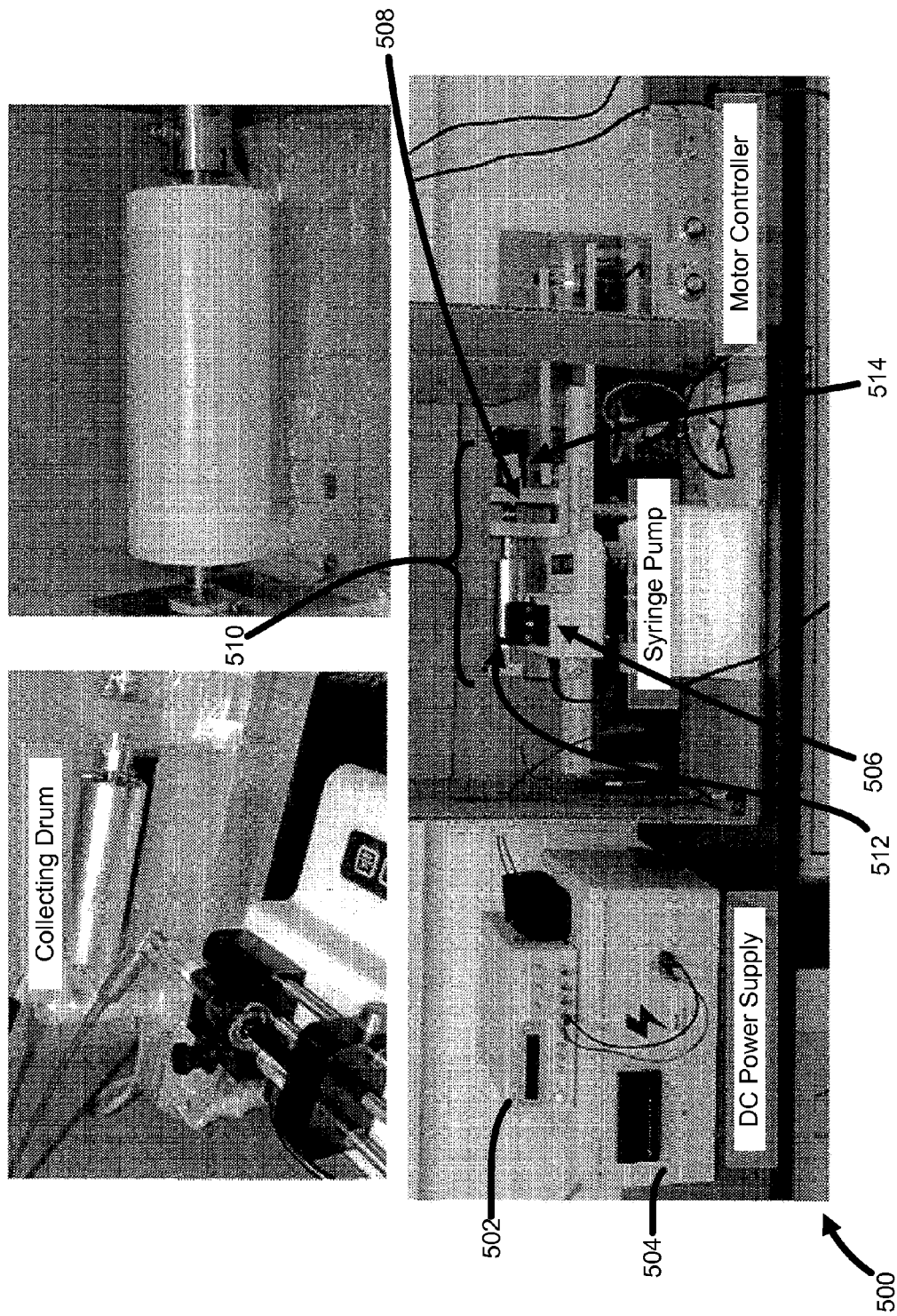
FIG. 10 is a photograph of an example of a manufacturing system for depositing onto a substrate a healing component such as the healing component of FIG. 8.

Reference can now be had to FIGS. 8-10 in which there is provided an example of a self-healing product 400 (FIGS. 8 and 9) and a manufacturing system 500 (FIG. 10) that can be utilized to construct portions of the self-healing product 400. Focusing first on the self-healing product 400 of FIGS. 8 and 9, the self-healing product 400 can comprise a composition 402 in which is found a shape memory component 404 and a healing component 406. The self-healing product 400 can further comprise a substrate 408 (e.g., substrate 214, 314) on which is deposited one or both of the shape memory component 404 and the healing component

406. The healing component 406 can form a layer 410 with an outer surface 412 for receiving, in one example, the shape memory component 404 thereon. The formation of the self-healing product 400, with particular emphasis on the interpenetration of the shape memory component 404 and the healing component 406, can occur by way of the Manufacturing Process described below.

This Manufacturing Process can be implemented on a manufacturing system, such as the example of a manufacturing system 500 that is illustrated in FIG. 10. The manufacturing system 500 can comprise a direct current ("DC") power supply 502, a voltage amplifier 504, and a syringe pump device 506 for dispersing the healing component 406 onto the substrate 408. The manufacturing system 500 can also comprise a collector apparatus 508 that can have a translating device 510 with an elongated drum 512, and a motion-inducing mechanism 514 that is coupled to the elongated drum 512. The translating device 510 can be configured to receive and secure the substrate 408, such as by providing means to affix the substrate to the outer surface of the elongated drum 512. The motion-inducing mechanism 514 is operatively configured with a plurality of degrees of freedom, which can in one example provide axial rotation and lateral translation of the translating device 510. The inventors have discovered that these features of the manufacturing system 500 are beneficial because these features can ensure deposition of the healing component 406 onto the substrate 408 to form the microstructure of fibers with homogenous thickness, as well as to facilitate orientation of the fibers in the network.

For purposes of the present example of the self-healing product 400, continued reference can be had to the FIGS. 8-10 as well as to the descriptions entitled Materials, Manufacturing Process, and Experimental Results that follows immediately below.

Materials

In one example, polymers available commercially can be used to fabricate the shape memory component (e.g., shape memory component 104, 204, 304, 404) and the healing component (e.g., healing component 106, 206, 306, 406) of the self-healing product described below. These polymers can comprise Norland Optical Adhesive 63 ("NOA63"), which in at least one form is a thiol-ene based UV curable liquid adhesive manufactured and sold by Norland Products Inc. of Cranbury, N.J. The polymers can also comprise poly (ε-caprolactone) ("PCL") manufactured and sold by Sigma Aldrich of St. Louis, Mo.

Manufacturing Process

In one example, a PCL solution for electro-spinning can be prepared by dissolving 15 wt-% PCL in a mixed solvent of chloroform and dimethylormamide ("DMF"), wherein the ratio of the volume of chloroform ($V_{chloroform}$) to the volume of DMF ($V_{DMF}$) is about 9:1. Utilizing the manufacturing system 500 of FIG. 7 above, the solution can be electro-spun directly onto the substrate 408, and in one particular construction the substrate 408 is a stainless steel foil with a thickness of about 50 µm. The stainless steel foil can be wrapped around the elongated drum 512, which is then rotated and translated to, e.g., form the layer 410 on the substrate 408.

While parameters and combinations of such parameters for the manufacturing process can vary, it is contemplated that the elongated drum 512 can rotate at an angular velocity from about 100 RPM to about 1000 RPM, and in one particular example the angular velocity can be about 400 RPM. Likewise the elongated drum 512 can translate laterally a distance from about 10 mm to about 100 mm, and at frequency from about 1 (translations/min) to about 25 (translations/min). A voltage from about 2 kV to about 30 kV (including 10 kV for this particular example) can be applied to the foil, and the PCL solution can be deposited at a constant flow rate from about 0.1 ml/hr to about 5 ml/hr, with the flow rate in the present example being about 0.5 ml/hr. The combination of these parameters can result in a microstructure of PCL fibers that forms the layer 410 with substantially uniform thickness over the substrate 408, wherein the average thickness of the layer is about 200 µm.

The layer 410 of PCL fibers can be infiltrated with the NOA63 such as by applying the NOA63 to the outer surface 412. Interpenetration of the PCL fibers and the NOA63 can be caused by wetting or other diffusive mechanism in which the NOA63 (as a liquid) permeate the microstructure of the PCL fibers found in the layer 410. This permeation can be facilitated by applying a vacuum to portions of the layer 410, and/or the self-healing product 400 such as by placing the vacuum at a portion of the layer 410 opposite the deposited NOA63. In one example, the vacuum can be applied until complete infiltration and interpenetration of the NOA63 with the PCL fibers is achieved, which may occur after at least about 10 min.

The self-healing product 400 can be cured to solidify the NOA63. In one process, excess NOA63 can be skimmed away from the outer surface 412 before the NOA63 is cured under, e.g., UV exposure. The UV exposure can be generated by a 30 W UV lamp, and in one particular example the self-healing product 400 is exposed to UV light of about 365 nm for at least about 2 hours.

Experimental Results

The self-healing product 400 that can result from the combination of Materials and Manufacturing Process discussed above can comprise such fibrous structure wherein the PCL fibers have diameters from several to about 10 µm. The average weight fraction of PCL in NOA63/PCL can be about 18%. The self-healing product 400 can exhibit self-healing characteristics that could be initiated by treatment via conductive heating from about 25° C. to about 80° C. at a rate of about 3° C./min. In one example, the final temperature of 80° C. was higher than the $T_g$ of NOA63 and the $T_m$ of PCL.

In view of the foregoing, there is contemplated embodiments of the self-healing products discussed above in which "healing" is a two-step process. These steps can be delineated by particular transition temperatures for each of the shape memory component (e.g., NOA) and the healing component (e.g., PCL). In one example, the transition temperatures correspond to at least one of the $T_g$ of the NOA63 and the $T_m$ of the PCL.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A self-healing product, comprising:
a first material comprising a covalently cross-linked semi-crystalline polymer having a first melting temperature that is between 25 and 80 degrees C. and, when heated above said first melting temperature, will release any stored strain energy; and
a second material comprising a polymer that is dispersed in the first material as a plurality of randomly oriented fibers arranged as an interpenetrating network where the fibers are thermally welded together to be adjoined via a plurality of nodes and having a second melting temperature that is within 25 degrees C. of the first melting temperature of said first material;
wherein heating said self-healing product to a predetermined temperature that is above the first melting temperature of the first material and above the second melting temperature of the second material, will cause said first material to release said stored strain energy and said second material to melt.

2. The self-healing product according to claim 1, wherein the first material comprises a shape memory polymer.

3. The self-healing product according to claim 1, wherein the second material is amenable to deposition using electrospinning.

4. The self-healing product according to claim 2, wherein the second material comprises a polymer and wherein the second melting temperature is greater than the first melting temperature of the first material.

5. The self-healing product according to claim 1, wherein the first material comprises a liquid resin.

6. The self-healing product according to claim 1, wherein each of the fibers have diameters that do not exceed the order of a micro-meter scale.

7. The self-healing product according to claim 1, further comprising a substrate having a surface for receiving one or more of the first material and the second material thereon.

8. The self-healing product according to claim 7, wherein the substrate comprises glass.

9. The self-healing product according to claim 1 wherein the first material solidifies in response to ultra-violet curing.

* * * * *

UNITED STATES PATENT AND TRADEMARK OFFICE
CERTIFICATE OF CORRECTION

| | | |
|---|---|---|
| PATENT NO. | : 9,533,469 B2 | Page 1 of 1 |
| APPLICATION NO. | : 12/644766 | |
| DATED | : January 3, 2017 | |
| INVENTOR(S) | : Patrick Mather and Xiaofan Luo | |

It is certified that error appears in the above-identified patent and that said Letters Patent is hereby corrected as shown below:

In the Specification

Please insert the following after Column 1, Line 11:

--STATEMENT REGARDING FEDERALLY SPONSORED RESEARCH OR DEVELOPMENT
This invention was made with government support under Grant No. DE-FG02-08ER85101 awarded by the Department of Energy (DOE). The government has certain rights in the invention.--

Signed and Sealed this
Third Day of April, 2018

Andrei Iancu
*Director of the United States Patent and Trademark Office*